United States Patent
Suzuki et al.

(10) Patent No.: US 9,163,625 B2
(45) Date of Patent: Oct. 20, 2015

(54) CURRENT LIMITED PULSE WIDTH MODULATION CONTROLLED MOTOR

(71) Applicant: AISIN SEIKI KABUSHIKI KAISHA, Kariya-shi (JP)

(72) Inventors: Shigemitsu Suzuki, Kariya (JP); Yutaka Iguchi, Kariya (JP); Atsushi Watanabe, Kariya (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 0 days.

(21) Appl. No.: 14/359,072

(22) PCT Filed: Nov. 15, 2012

(86) PCT No.: PCT/JP2012/079657
§ 371 (c)(1),
(2) Date: May 16, 2014

(87) PCT Pub. No.: WO2013/080805
PCT Pub. Date: Jun. 6, 2013

(65) Prior Publication Data
US 2014/0286793 A1 Sep. 25, 2014

(30) Foreign Application Priority Data
Nov. 30, 2011 (JP) .................................. 2011-262501

(51) Int. Cl.
*F04B 49/06* (2006.01)
*F04B 17/03* (2006.01)
(Continued)

(52) U.S. Cl.
CPC .................. *F04B 49/06* (2013.01); *F04B 17/03* (2013.01); *F04B 49/065* (2013.01); *H02P 1/42* (2013.01);
(Continued)

(58) Field of Classification Search
CPC .................. F04B 49/04; F04B 2203/02; F04B 2203/0201; F04B 2203/0202; F04B 2203/0204; F04B 2203/0208; F04B 2203/0212; F04B 2202/0213
See application file for complete search history.

(56) References Cited

U.S. PATENT DOCUMENTS 3,586,990 A * 6/1971 Willoner ........................ 330/107
2004/0169488 A1 9/2004 Maeda et al.
(Continued)

FOREIGN PATENT DOCUMENTS

CN 1783698 A 6/2006
CN 102035457 A 4/2011
(Continued)

OTHER PUBLICATIONS

International Preliminary Report on Patentability (Form PCT/IB/373) and Written Opinion of the International Searching Authority and English Translation thereof (Form PCT/ISA/237) issued on Jan. 16, 2014 in the corresponding International Application No. PCT/JP2012/079657 (6 pages).
(Continued)

*Primary Examiner* — Bryan Lettman
*Assistant Examiner* — Timothy P Solak
(74) *Attorney, Agent, or Firm* — Buchanan Ingersoll & Rooney PC

(57) ABSTRACT

In order to realize, without inviting cost increase, a control for maintaining a pressure of fluid delivered from a pump at a target value, a pump control unit is provided with a driver control unit controlling a rotational speed of a hydraulic pump through adjustment of a duty ratio of a PWM signal driving excitation coils of an electric motor. Further, the pump control unit is provided also with a signal correction circuit configured to convert a current flowing in the excitation coils to a voltage signal with using a shunt resistor and to divide the voltage signal with using a voltage division ratio setting circuit and to shorten an ON signal of the PWM signal by increasing the divided voltage. The voltage division ratio setting circuit has a characteristics of setting the divided voltage higher, the longer an ON period of the PWM signal.

6 Claims, 2 Drawing Sheets

(51) Int. Cl.
*H02P 5/68* (2006.01)
*H02P 1/42* (2006.01)
*H02P 6/00* (2006.01)
*H02P 6/18* (2006.01)

(52) U.S. Cl.
CPC *H02P 5/68* (2013.01); *H02P 6/002* (2013.01); *H02P 6/18* (2013.01); *F04B 2203/0201* (2013.01); *F04B 2203/0202* (2013.01); *F04B 2203/0204* (2013.01); *F04B 2203/0209* (2013.01); *F04B 2203/0213* (2013.01)

(56) References Cited

U.S. PATENT DOCUMENTS

| | | | | |
|---|---|---|---|---|
| 2006/0028161 | A1* | 2/2006 | Yamamoto et al. | 318/432 |
| 2008/0048598 | A1* | 2/2008 | Shibuya | 318/400.1 |
| 2008/0297079 | A1* | 12/2008 | Kanamori et al. | 318/400.06 |
| 2009/0146590 | A1* | 6/2009 | Hamasaki | 318/400.02 |
| 2010/0047080 | A1* | 2/2010 | Bruce | 417/45 |
| 2011/0080126 | A1 | 4/2011 | Yabuguchi et al. | |

FOREIGN PATENT DOCUMENTS

| | | |
|---|---|---|
| JP | 2001-268935 A | 9/2001 |
| JP | 2004-309386 A | 11/2004 |
| JP | 2004-353624 A | 12/2004 |
| JP | 2005-094938 A | 4/2005 |
| JP | 2006-325332 A | 11/2006 |
| JP | 2008-271628 A | 11/2008 |

OTHER PUBLICATIONS

International Search Report (PCT/ISA/210) mailed on Feb. 12, 2013, by the Japanese Patent Office as the International Searching Authority for International Application No. PCT/JP2012/079657.

Office Action/Search Report issued on Mar. 18, 2015, by the Chinese Patent Office in corresponding Chinese Patent Application No. 201280058517.5 and an English translation of Office Action/Search Report. (10 pages).

* cited by examiner

CURRENT LIMITED PULSE WIDTH MODULATION CONTROLLED MOTOR

TECHNICAL FIELD

The present invention relates to a pump control unit, more particularly to improvement of a technique of supplying a power to a plurality of excitation coils of a pump-driving electric motor through pulse width modulation.

BACKGROUND ART

As a pump control unit configured as above, PTL 1 shows a sensor-less, three-phase brushless DC motor for driving a hydraulic pump and discloses a control device having a microcomputer-controlled motor driving IC and an FET circuit controlled by this motor driving IC. The control device disclosed in this PTL 1 includes a unit rotational angle detection circuit detecting rotation of the electric motor and providing the detected rotation to the motor driving IC and a power current detection circuit detecting a current value fed to the electric motor (excitation coils) by a shunt resistor through the FET circuit and feeding the detected current value to a microcomputer.

According to PTL 1, the microcomputer effects a PWM calculation and result of this calculation is given from the motor driving IC to the FET circuit to set a duty ratio, according to which control of rotation of the electric motor is executed.

CITATION LIST

Patent Literature

PTL 1: Japanese Unexamined Patent Application Publication No. 2004-353624

SUMMARY OF INVENTION

Technical Problem

When a hydraulic pump is driven by an electric motor and a constant oil pressure control is executed for maintaining an oil pressure of work oil supplied from this hydraulic pump at a set value, it is conceivable to execute a control detecting the oil pressure of the work oil supplied from the hydraulic pump by an oil pressure sensor and setting a duty ratio with high precision for maintaining this detected value at a target value.

However, in order to realize the control for high-precision setting of a duty ratio to maintain a pressure of work oil at a target value, a microprocessor is required. This invites cost increase for development of a software and an arrangement including a microprocessor can invite delay in the control. In these regards, there is room for improvement.

The object of the present invention is to realize, without inviting cost increase, a control for maintaining a pressure of fluid delivered from a pump at a target value.

Solution to Problem

According to a characterizing feature of the present invention, an electric motor driving a pump is provided with a driving arrangement that a rotor is driven to rotate by a magnetic field with supply of electric power to a plurality of excitation coils; and there are provided a power control section setting a duty ratio of a current to be fed to the excitation coils; a shunt resistor converting the current flowing in the excitation coils to a voltage signal; a voltage division ratio setting circuit generating, from the voltage signal from the shunt resistor, a detected voltage signal having a voltage division ratio corresponding to the duty ratio; and a power correction section changing the duty ratio set by the power control unit based on the detected voltage signal.

According to the above-described arrangement, a current supplied to the excitation coils is converted by the shunt resistor to a voltage signal. Then, based on this voltage signal, the voltage division ratio setting circuit generates a detected signal value having a voltage division ratio corresponding to the duty ratio. For instance, if the voltage division ratio setting circuit is configured to increase a divided voltage in a state of a high duty ratio, as compared with a state of a low duty ratio, it will become also possible to increase significantly a detected voltage signal in case the value of current flowing in the excitation coils varies under a state of a high duty ratio. And, it becomes also possible for the power correction section to maintain the power to be supplied to the excitation coils by changing the duty ratio based on the detected voltage signal.

In particular, this arrangement can realize a processing in which a change in the detected voltage signal is decreased in case the value of current flowing in the excitation coils varies under a state of a low duty ratio, so that a required power is supplied to the excitation coils without any change of the duty ratio by the power correction section.

Accordingly, it has become possible to realize, without inviting cost increase and with a good response, a control maintaining a current to be supplied to excitation coils for maintaining a pressure of fluid delivered from a pump at a target value, without providing any additional processing device such as a microprocessor.

In the present invention, preferably, the power control section outputs a signal for setting a power control element to an ON state according to a set duty ratio; and the power correction section effects a correction operation shortening an ON period of the power control element if the detected voltage signal exceeds a set value.

With the above, the power correction section effects a correction operation for shortening the ON period of the power control element if the detected voltage signal exceeds a set value, whereby increase in the current to flow in the excitation coils can be restricted to be maintained at the target value.

In the present invention, preferably, the voltage division ratio setting circuit includes a plurality of voltage dividing resistors dividing the voltage signal from the shunt resistor and a capacitor disposed parallel with a grounding-side voltage dividing resistor included in the plurality of voltage dividing resistors.

With the above arrangement, under a state of low duty ratio, a current flows in the capacitor, with the capacitor repeating charging and discharging. As a result, the value of current flowing in the grounding-side voltage dividing resistor is decreased, which causes corresponding decrease in the detected voltage signal from the voltage division ratio setting circuit. Conversely, under a state of high duty ratio, the capacitor will be hardly discharged and be maintained under a charged state. As a result, the value of current flowing in the grounding-side voltage dividing resistor is increased, which causes corresponding increase in the detected voltage signal from the voltage division ratio setting circuit. Namely, under a state of low duty ratio such as at the time of starting of the motor, if the value of current flowing in the excitation coils exceeds a set value, the duty ratio is maintained for realizing acceleration of the electric motor in a reliable manner. Also, if the value of current flowing in the excitation coils exceeds the set value under a state of high duty ratio such as at the time of constant rotation of the electric motor, the ON period of the duty ratio will be shortened for reducing the rotational speed of the electric motor with good response, so that increase in the discharge pressure can be restricted.

In the present invention, preferably, there is provided a relief valve relieving a pressure of fluid delivered from the pump when the pressure of the fluid delivered from the pump exceeds a preset required pressure.

With the above-described arrangement, by relieving the pressure of fluid by the relief valve when the pressure of the fluid delivered from the pump exceeds a preset required pressure, it is possible to restrict excessive increase in the oil pressure, so that load on the electric motor can be reduced and heat generation from the excitation coils can be restricted.

In the present invention, preferably, there is provided a driver circuit disposed between the power control section and the electric motor, the driver circuit switching over the power control element according to the duty ratio to supply power to the excitation coils; and the voltage division ratio setting circuit generates the detected voltage signal, based on a voltage signal between the driver circuit and the shunt resistor.

In the present invention, preferably, the voltage dividing resistors include a first voltage dividing resistor connected to the other end of the shunt resistor having one end connected to the ground, and second and third voltage dividing resistors connected in series with the first voltage dividing resistor; and the detected voltage signal is generated at a position between the second voltage dividing resistor and the third voltage dividing resistor.

DESCRIPTION OF EMBODIMENTS

Next, embodiments of the present invention will be described with reference to the accompanying drawings.
[General Construction]

Figure 1:
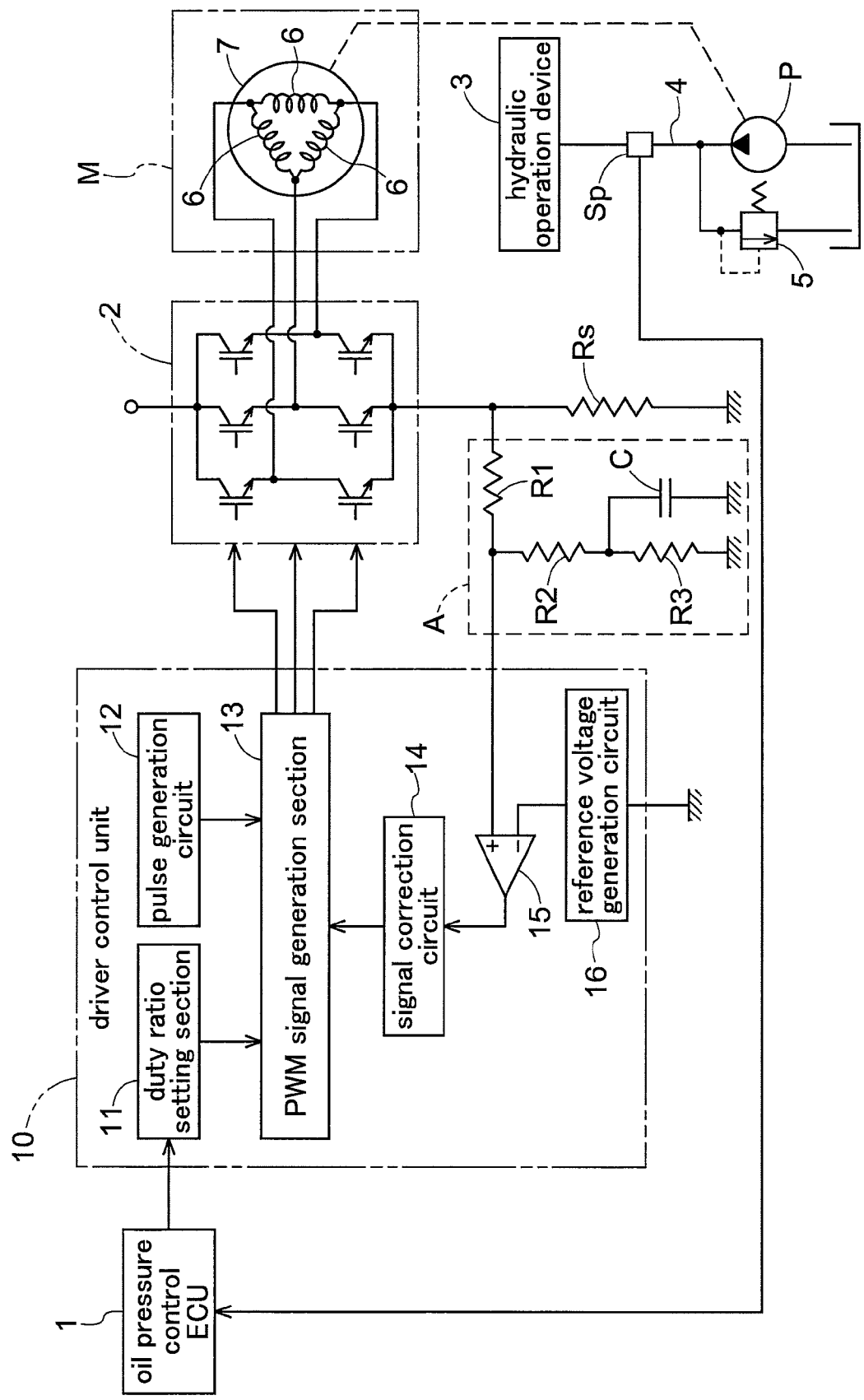
FIG. 1 is a block circuit diagram of a pump control unit.

As shown in FIG. 1, a pump control unit to be mounted on a vehicle includes an oil pressure control ECU 1, a driver control unit 10 (an example of "a power control section"), a driver circuit 2, an electric motor M and a hydraulic pump P.

An engine of a vehicle such as a passenger car, etc. includes a hydraulic operation device 3 such as a valve timing control mechanism, a hydraulic actuator, etc.; and the inventive pump control unit is configured such that the driver control unit 10 controls power to be supplied to the electric motor M by pulse width modulation, thereby to control rotational drive of the hydraulic pump P.

As an example of the vehicle on which the inventive pump control unit is mounted, there can be cited a vehicle in which idle reduction control is effected. More particularly, the vehicle includes a hydraulic system having a main hydraulic pump (not shown) driven by the engine and the inventive hydraulic pump P in parallel with each other, and the hydraulic operation device 3 to which work oil is supplied from the hydraulic system. When the idle reduction control is effected with the above-described arrangement, the pump control unit of the present invention controls the electric motor M for driving the hydraulic pump P so that supply of work oil to the hydraulic operation device 3 is realized also at the time of stop of the engine.

Further, as another example of the vehicle on which the inventive pump control unit is mounted, there can be cited a hybrid type vehicle having a hydraulic pump P controlling the electric motor M. With this vehicle, work oil is supplied to the hydraulic operation device 3 at the time of stop of the engine, and also a portion of the work oil from the hydraulic pump P is supplied as being cooled by an oil cooler to a hybrid motor in order to realize cooling of this hybrid motor.

The pump control unit shown in FIG. 1 includes a main oil passage 4 for supplying the work oil from the hydraulic pump P to the hydraulic operation device 3, the main oil passage 4 incorporating a relief valve 5 for relieving pressure at the time of pressure increase of the work oil. And, there is provided a hydraulic system for feeding a portion of the work oil not fed to the hydraulic operation device 3 as a lubricant oil to a main oil gallery (not shown) of the engine. The main oil passage 4 incorporates also an oil pressure sensor Sp for detecting pressure of the work oil delivered from the hydraulic pump P and detection result from this oil pressure sensor Sp is fed back to the oil pressure control ECU 1.

The electric motor M is configured as a sensor-less brushless DC motor having a plurality of excitation coils 6 and a rotor 7 rotatably driven by the effects of magnetic fields from the excitation coils 6 and this electric motor M is controlled by the driver control unit 10.

The oil pressure control ECU 1 sets a work oil pressure to be achieved according to a rotational speed of the engine or a traveling situation of the vehicle and sets target duty ratio information for obtaining this work oil pressure and outputs this information to the driver control unit 10. The driver control unit 10 effects driving of the electric motor M by generating a PWM signal based on the target duty ratio information and controlling power control devices such as a plurality of power transistors, MOSFET etc. of the driver circuit 2.

This pump control unit includes a shunt resistor Rs for converting a current supplied to the driver circuit 2 to a voltage signal and a voltage division ratio setting circuit A comprised of three voltage dividing resistors R1, R2, R3 and a capacitor C for generating, from the voltage signal from the shunt resistor Rs, a detected voltage signal having a voltage division ratio corresponding to a duty ratio.

The driver control unit 10 executes a control for varying a duty ratio of the PWM signal to be outputted from this driver control unit 10 to the driver circuit 2 by acquiring the detected voltage signal from the voltage division ratio setting circuit A. The configuration and modes of operations of this driver control unit 10 will be explained next.

[Driver Control Unit]

The driver control unit 10 includes a duty ratio setting section 11, a pulse generation circuit 12, a PWM signal generation section 13, a signal correction circuit 14 (an example of "a power correction section"), a comparator 15 and a reference voltage generation circuit 16.

The duty ratio setting section 11 gives target duty ratio information outputted from the oil pressure control ECU 1 as a threshold value obtained through its D/A conversion process to the PWM signal generation section 13. The pulse generation circuit 12 generates drive pulses having a set frequency and provides them to the PWM signal generation section 13.

The PWM signal generation section 13 includes a comparator (not shown) for generating a PWM signal based on the threshold value from the duty ratio setting section 11 and a sawtooth-wave signal generated by an oscillator circuit (not shown) incorporated therein. The PWM signal generation section 13 includes also an output circuit (not shown) outputting the PWM signal at a carrier frequency in synchronism with the driving pulse signal from the pulse generation circuit 12 to the plurality of power control elements in the driver circuit 2 and a correction circuit (not shown) for shortening an ON period of the PWM signal by varying the threshold value based on a correction signal from the signal correction circuit 14.

The signal correction circuit 14 gives a correction signal to the PWM signal generation section 13 in response to an output signal, if any, outputted from the comparator 15. In response of this correction signal inputted thereto, the PWM signal generation section 13 shortens the ON period of the PWM signal by adjusting the threshold value.

The comparator 15 is subject to impingement of a reference voltage at one input terminal thereof from the reference voltage generation circuit 16 and impingement of a detected voltage signal at the other input terminal thereof from the voltage division ratio setting circuit A. The voltage division ratio setting circuit A produces, from the voltage signal from the shunt resistor Rs, a detected voltage signal having a voltage division ratio corresponding to a duty ratio. With this arrangement, if the detected voltage signal from the voltage division ratio setting circuit A exceeds the reference voltage (set value) generated by the reference voltage generation circuit 16, the comparator 15 outputs an output signal from its output terminal.

(Other Embodiment of Driver Control Unit)

In this embodiment, the driver control unit 10 is provided with a clock generation circuit and a counter, and the duty ratio setting section 11 is configured to provide a clock number indicative of an ON period of the PWM signal. Further, the PWM signal generation section 13 is configured to generate a waveform of the PWM signal which has an ON state only for duration of a period of the clock number corresponding to the ON period being counted and an OFF state only for duration of a period of the clock number corresponding to an OFF period being counted. In this further embodiment, change of the duty ratio of PWM signal is made possible by a logic of the clock generation circuit, the counter, gates, registers, etc.

Further, the driver control unit 10 is provided with a start control circuit for increasing the ON period of the duty ratio of the PWM signal from a low value to a high value, at the time of start of the electric motor M. In this case of the driver control unit 10 being provided with the start control circuit, the oil pressure control ECU 1 needs to output only signals instructing start and stop of the electric motor M. Thus, simplification of the configuration of the oil pressure control circuit ECU 1 is realized.

(Other Embodiment of Signal Correction Circuit)

The signal correction circuit 14 is constituted of a switching element incorporated in a signal path of outputting from the PWM signal generation section 13 to the driver circuit 2 and this switching element is configured to be turned OFF in response to the output signal from the comparator 15. With this, the operation mode for shortening the ON period will be realized by blocking the PWM signal at a timing of the output signal being outputted from the comparator 15.

Moreover, as explained in the further embodiment of the driver control unit 10 above, in case the PWM signal generation section 13 is constituted of a clock generation circuit, a counter, a logic, etc., change of the duty ratio is realized by causing the signal correction circuit 14 to effect a processing of changing the count value corresponding to the ON period.

[Voltage Division ratio Setting Circuit]

The voltage division ratio setting circuit A, as shown in FIG. 1, is configured such that between a position that the voltage signal of the shunt resistor Rs acts and the grounding position (between the terminals of the shunt resistor Rs), three resistors, i.e. the voltage dividing resistors R1, R2, R3 are connected in series in this order and the capacitor C is connected in parallel with the voltage dividing resistor R3 on the most grounding side. With this configuration in operation, a detected voltage signal having a voltage division ratio corresponding to a duty ratio is generated based on the voltage signal from the shunt resistor Rs and this signal can be retrieved from a position between the voltage dividing resistor R1 and the voltage dividing resistor R2.

With this voltage division ratio setting circuit A, in case the duty ratio of the PWM signal is low (the case of the ON duration being short), the capacitor C repeats charging and discharging. As a result, the voltage signal from the shunt resistor Rs flows to the capacitor C, which causes corresponding decrease in the value of the current flowing to the grounding-side voltage dividing resistor R3, thus restricting rise in the detected voltage signal to be applied to the input terminal of the comparator 15. That is, most of the voltage signal from the shunt resistor Rs is subjected to voltage divisions by the two voltage dividing resistors R1, R2.

Conversely, in case the duty ratio of the PWM signal is high (the case of the ON period being long), the capacitor C will be almost maintained under a charged state. As a result, the voltage signal from the shunt resistor Rs hardly flows to the capacitor C, which causes corresponding increase in the value of the current flowing to the grounding-side voltage dividing resistor R3, so that the voltage generated from this voltage dividing resistor R3 too rises, thus raising the voltage to be applied to the input terminal of the comparator 15. That is, most of the voltage signal from the shunt resistor Rs is subjected to voltage divisions by the three voltage dividing resistors R1, R2, R3.

(Other Embodiments of Voltage Division Ratio Setting Circuit)

The voltage division ratio setting circuit A may be configured to include a processing device for converting a detected voltage signal from the shunt resistor Rs to a digital signal through A/D conversion and making the range of change the smaller, the lower the duty ratio set by the PWM signal generating section 13. This arrangement allows omission of the voltage dividing resistors, thus making the detection precision non-affected by the precision of the voltage dividing resistors.

Moreover, according to a still further embodiment of this voltage division ratio setting circuit A, the capacitor C is omitted and the grounding-side voltage dividing resistor (e.g. R3 in FIG. 1) is comprised of a variable resistor and there is provided an actuator such as a servo motor for operating this variable resistor, and the control system for controlling the actuator is configured to lower the resistance value of the voltage dividing resistor comprising the variable resistor in correspondence with decrease in the duty ratio. In the case of this configuration, it is also possible to set the operational mode of the actuator to set characteristics requiring relationship of a change amount of the voltage dividing resistor relative to a change amount of the duty ratio.

According to a still further embodiment of the voltage division ratio setting circuit A, the capacitor C is omitted and and the grounding-side voltage dividing resistor (e.g. R3 in FIG. 1) is comprised of a digital potentiometer, and the control system is configured to lower the resistance value of the digital potentiometer in correspondence with decrease in the duty ratio. In the case of this configuration too, it is also possible to set characteristics requiring relationship of a change amount of the voltage dividing resistor relative to a change amount of the duty ratio.

[Operational Mode of Pump Control Unit]

At the time of start of the hydraulic pump P, in order to increase the rotational speed of the electric motor M, the oil pressure control ECU 1 executes control for progressively increasing the duty ratio of the PWM signal from a low value to a high values. Further, in a situation of the duty ratio of the PWM signal being low, in case the current flowing in the excitation coils 6 increases due to e.g. load acting on the electric motor M, the detected voltage signal from the shunt resistor Rs too rises. However, in the voltage division ratio setting circuit A, in case the duty ratio is low, in order to generate a detected voltage signal having a low voltage division ratio, rise in the detected voltage signal to be applied from the voltage division ratio setting circuit A to the input terminal of the comparator 15 is restricted and no output of output signal from the comparator 15 occurs, either. With this, no shortening of the ON period is effected at the PWM signal generation section 13 in case rise in the rotational speed of the electric motor M is intended, and rising of the rotational speed is effected smoothly, with the hydraulic pump P being driven powerfully by the electric motor M.

Figure 2:
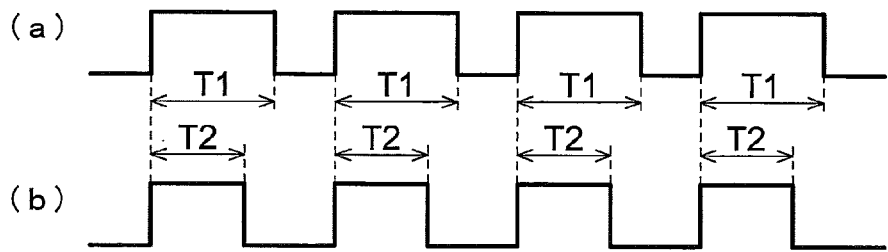
FIG. 2 is a chart showing change in a duty ratio of a PWM signal.

Further, when a constant oil pressure control is executed, the oil pressure control ECU 1 obtains, by the hydraulic pump P, a target oil pressure by effecting a control of setting a target duty ratio to 100%. That is, in order to obtain constant rotation of the electric motor M, a current having 100% duty ratio is supplied as the PWM signal. With this, the capacitor C of the voltage division ratio setting circuit A is maintained under a charged state, so that the current flowing in the excitation coils 6 is increased and when the voltage signal from the shunt resistor Rs rises, there occurs with good response an increase in the detected voltage signal to be applied from the voltage division ratio setting circuit A to the input terminal of the comparator 15. Accordingly, for instance, like a case illustrated in FIG. 2 in which the PWM signal having an ON period T1 is shortened to an ON period T2, the ON period is shortened at the PWM signal generation section 13, whereby rise in the driving speed of the electric motor M is restricted, thus restricting occurrence of inconvenience of excessive increase in the oil pressure of the work oil delivered from the hydraulic pump P.

[Graph Showing Relationship Between Required Oil Pressure, Motor Current, etc.]

Figure 3:
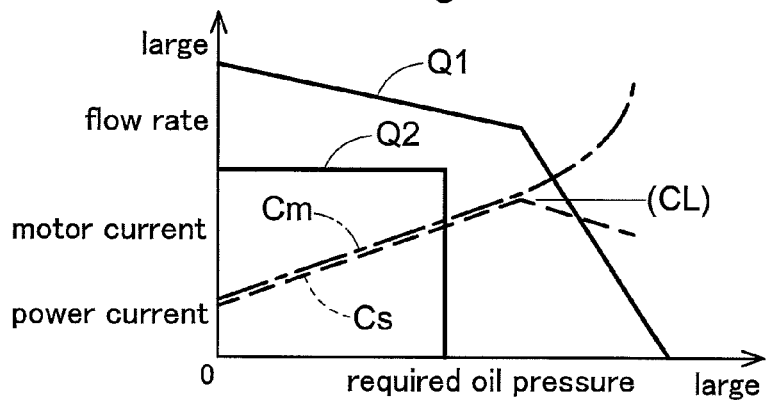
FIG. 3 is a graph showing changes in a work oil flow rate, a motor current and a power current relative to requested oil pressures.

FIG. 3 shows a graph relating to an arrangement having no relief valve 5, with the horizontal axis representing the required oil pressure, the vertical axis representing flow rates Q1, Q2 of the work oil, the motor current Cm and power current Cs. As shown in this graph, in association with rise in the required oil pressure, the motor current Cm and the power current Cs rise diagonally up and to the right. The motor current Cm and the power current Cs correspond to the duty ratio. After arrival at a power current limit value CL (duty ratio of 100%), the ON period of the duty ratio is shortened as described above and the power current Cs falls diagonally down and to the right and the motor current Cm increases due to the effect from the excitation coils 6. In this way, when the required oil pressure rises, the required oil amount Q2 is secured and also the flow rate Q1 of the work falls diagonally down and to the right in association with increase in the required oil pressure. And, after the power current Cs reaches a power current limit value CL, the flow rate Q1 falls even more steeply to the right.

Figure 4:
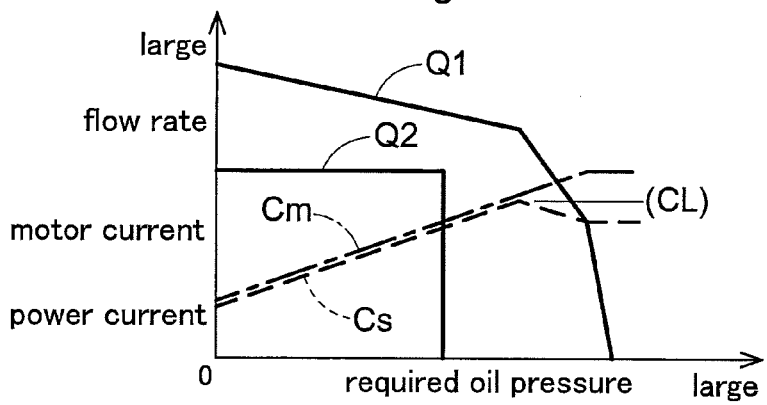
FIG. 4 is a graph showing changes in a work oil flow rate, a motor current and a power current relative to requested oil pressures, in the case of an arrangement provided with a relief value.

FIG. 4 shows a graph relating to an arrangement having the relief valve 5, with the horizontal axis representing the required oil pressure, the vertical axis representing flow rates Q1, Q2 of the work oil, the motor current Cm and power current Cs. The relief valve 5 has a relief pressure set in such a manner as to relieve pressure of work oil at a pressure slightly over the upper limit of the required oil pressure (required pressure). As shown in this graph, in association with rise in the required oil pressure, the motor current Cm and the power current Cs rise diagonally up and to the right. The motor current Cm and the power current Cs correspond to the duty ratio. After arrival at the power current limit value CL, the ON period of the duty ratio is shortened as described above and the power current Cs falls diagonally down and to the right and the motor current Cm increases due to the effect from the excitation coils 6. In this way, when the required oil pressure rises, the required oil amount Q2 is secured and also the flow rate Q1 of the work falls diagonally down and to the right in association with increase in the required oil pressure. And, after the relief valve 5 reaches the relief pressure, the flow rate Q1 falls even more steeply to the right.

Figure 5:
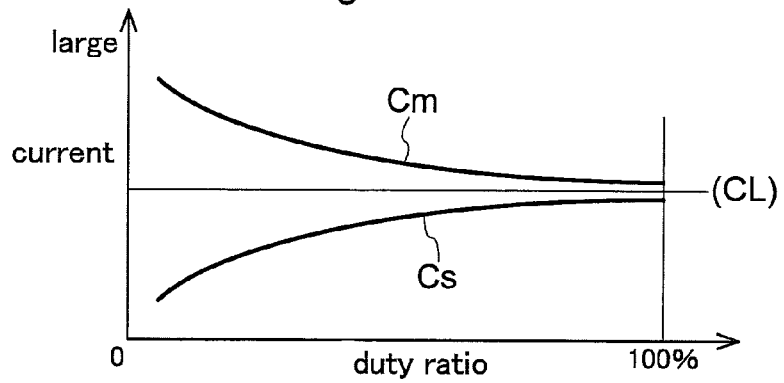
FIG. 5 is a graph showing changes in a motor driving current and a power current according as the duty ratio varies.

FIG. 5 shows a graph, with the horizontal axis representing a duty ratio, the vertical axis representing the current. As shown in this graph, in association with rise in the power current Cs, the motor current Cm decreases. Namely, the excitation coils 6 of the electric motor store an amount of current at the time of low rotational speed, so the motor current Cm shows a large value, but this falls in association with rise in the power current Cs. And, when the duty ratio reaches 100%, the power current Cs and the motor current Cm have similar values to each other.

INDUSTRIAL APPLICABILITY

The present invention is applicable to a device for controlling a rotational speed of an electric motor for driving a pump through setting of a duty ratio of a PWM signal.

REFERENCE SIGNS LIST 5 relief valve
6 excitation coils
7 rotor
10 power control section (diver control unit)
14 power correction section (signal correction circuit)
A voltage division ratio setting circuit
M electric motor
P pump (hydraulic pump)
Rs shunt resistor
R1 voltage dividing resistor
R2 voltage dividing resistor
R3 voltage dividing resistor
C capacitor

The invention claimed is:

1. A pump control unit in which an electric motor driving a pump is provided with a driving arrangement that a rotor is driven to rotate by a magnetic field with a supply of electric power to a plurality of excitation coils, the unit comprising:
   a power control section setting a duty ratio of a current to be fed to the excitation coils;
   a shunt resistor converting the current flowing in the excitation coils to a voltage signal; and a voltage division ratio setting circuit generating, from the voltage signal from the shunt resistor, a detected voltage signal having a voltage division ratio corresponding to the duty ratio, the voltage division ratio setting circuit including a plurality of voltage dividing resistors dividing the voltage signal from the shunt resistor and a capacitor disposed parallel with a ground-side voltage dividing resistor included in the plurality of voltage dividing resistors;

wherein the power control section includes:
  a reference voltage generation circuit for generating a reference voltage,
  a comparator receiving the reference voltage from the reference voltage generation circuit as one input terminal thereof and receiving the detected voltage signal at the other input terminal thereof from the voltage division ratio setting circuit, the comparator outputting an output signal from its output terminal when the detected voltage signal exceeds the reference voltage, and
  a power correction section changing the duty ratio set by the power control section based on the output signal;

wherein the power control section outputs a signal for setting a power control element to an ON state according to a set duty ratio; and the power correction section effects a correction operation shortening an ON period of the power control element if the output signal exceeds a set value.

2. The pump control unit according to claim 1, further comprising a relief valve relieving a pressure of fluid delivered from the pump when the pressure of the fluid delivered from the pump exceeds a preset required pressure.

3. The pump control unit according to claim 1, further comprising a driver circuit disposed between the power control section and the electric motor, the driver circuit switching over the power control element according to the duty ratio to supply power to the excitation coils; and
  wherein the voltage division ratio setting circuit generates the detected voltage signal, based on a voltage signal between the driver circuit and the shunt resistor.

4. The pump control unit according to claim 1, wherein the reference voltage generation circuit is connected to the comparator at one end of the reference generation circuit and connected to the ground at the other end of the reference generation circuit.

5. The pump control unit according to claim 1, wherein the voltage dividing resistors include a first voltage dividing resistor connected to one end of the shunt resistor, the other end of the shunt resistor being connected to the ground, and second and third voltage dividing resistors connected in series with the first voltage dividing resistor; and
  wherein the detected voltage signal is generated at a position between the first voltage dividing resistor and the second voltage dividing resistor.

6. The pump control unit according to claim 5, wherein the third voltage dividing resistor is disposed parallel with the capacitor.

* * * * *